(12) United States Patent
Dussel

(10) Patent No.: US 6,174,362 B1
(45) Date of Patent: Jan. 16, 2001

(54) PROCESSING EQUIPMENT AND METHOD FOR A PULVERULENT CALCIUM SULPHATE MATERIAL AND NOVEL HYDRAULIC BINDER

(76) Inventor: Christian Dussel, 79 rue du Lac, F-31150 Lespinasse (FR)

( * ) Notice: Under 35 U.S.C. 154(b), the term of this patent shall be extended for 0 days.

(21) Appl. No.: 08/952,320

(22) PCT Filed: Apr. 24, 1996

(86) PCT No.: PCT/FR96/00622

§ 371 Date: Oct. 27, 1997

§ 102(e) Date: Oct. 27, 1997

(87) PCT Pub. No.: WO96/33957

PCT Pub. Date: Oct. 31, 1996

(Under 37 CFR 1.47)

(30) Foreign Application Priority Data

Apr. 25, 1995 (FR) .................................................. 95 05189

(51) Int. Cl.[7] ...................................................... C04B 11/00
(52) U.S. Cl. ........................... 106/772; 106/775; 432/11; 432/18; 432/118; 432/147
(58) Field of Search .................................... 106/735, 772, 106/775; 432/11, 18, 118, 147

(56) References Cited

U.S. PATENT DOCUMENTS 3,145,980   8/1964   Smith, Jr. .

FOREIGN PATENT DOCUMENTS

| 2572721 | 5/1986 | (FR) . |
|---|---|---|
| 824074 | 11/1959 | (GB) . |
| WO 90/08111 | 7/1990 | (WO) . |
| WO 94/15161 | 7/1994 | (WO) . |

OTHER PUBLICATIONS

W. Gerhartz et al., "Benzyl Alcohol to Calcium Sulfate", *Ullmann's Encyclopedia of Industrial Chemistry,* vol. A4, pp. 556–569.

"Le Platre Physico–chimie Fabrication Et Emplois", *Syndicat National Des Industries Du Platre,* Paris, pp. 90–91.

Chemical Abstracts 278471 May 1994.

Chemical Abstracts 179826 May 1992.

*Primary Examiner*—Paul Marcantoni
(74) *Attorney, Agent, or Firm*—Young & Thompson

(57) ABSTRACT

A method for processing a pulverulent calcium sulphate material in order to obtain a hydraulic binder is described, including combining the following two successive processing steps: (a) heating the pulverulent material in a curing tunnel (1) at a temperature of 220–360° C., under conditions suitable for primarily forming an α-type calcium sulphate, and (b) subjecting the heated material to a thermal quenching step in a cooling apparatus (2), with a cold, dry gas to stabilise the α anhydrite and to prevent its conversion into other crystallographic types. The method provides a novel hydraulic binder with an α anhydrite content of more than 35 wt. %, and with improved strength and behavior in fire resistance properties.

17 Claims, 7 Drawing Sheets

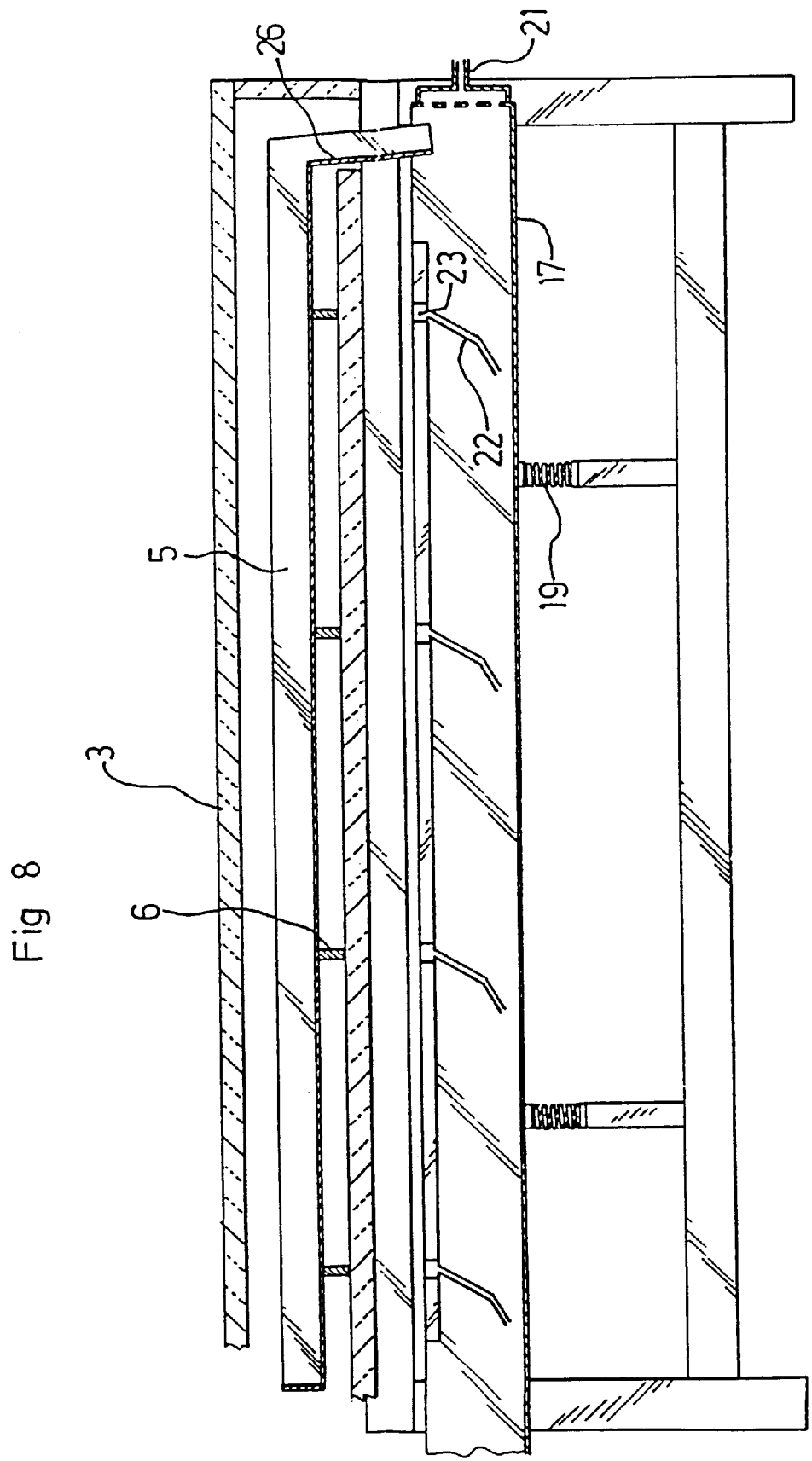

Figure 1:
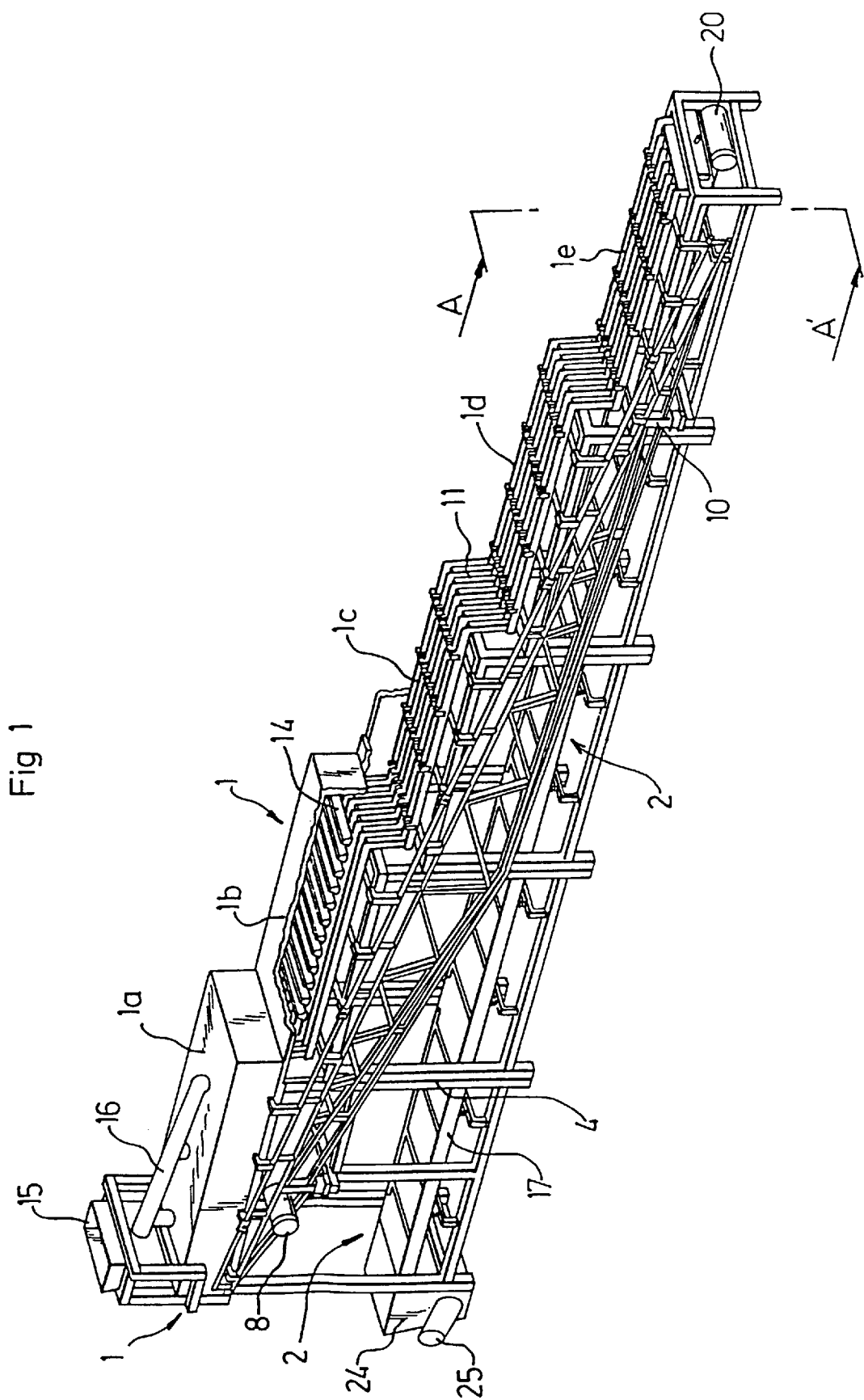

PROCESSING EQUIPMENT AND METHOD FOR A PULVERULENT CALCIUM SULPHATE MATERIAL AND NOVEL HYDRAULIC BINDER

The invention relates to a process for the treatment of a first pulverulent material based on natural calcium sulfate (gypsum) or synthetic calcium sulfate (sulfogypsum, phosphogypsum and other sub-products of the same type) so as to prepare a new hydraulic binder. It relates to an installation permitting the practice of the process, as well as to hydraulic binders adapted to be produced by the process.

Several types of processes for the treatment of calcium sulfate have been proposed to prepare plaster. In particular, it is known to prepare improved plasters (sometimes called "α plasters") which, once hardened, have much better mechanical characteristics than those of present plasters. The phenomena which take place in the course of treatment are poorly known and the improvement in the mechanical performance is generally attributed to the presence of the crystallographic variety a in the known products, without knowing exactly the proportion of this variety in these products nor the conditions which permit obtaining it in a stable and reproducible manner.

Conventionally, these improved plasters are made from gypsum by subjecting the latter to a heating phase in steam in an autoclave, then to a hot drying phase by a current of hot dry air. The heating takes place in a saturated steam atmosphere at a pressure of the order of 5 to 10 bars for a period of the order of 10 hours.

In an attempt to overcome the drawbacks of this conventional process for the production of improved plaster (extremely costly production, uncertain reproducibility), there have been proposed other processes which in fact attempt to reproduce the essential conditions of the conventional process (steam heating, followed by drying in hot air) by using different means and technologies (patents FR 2,389,855, FR 2,445,940, FR 2,572,721, U.S. Pat. No. 2,269,580, U.S. Pat. No. 3,145,980).

The present invention seeks to provide a new treatment process which leads to a new hydraulic binder which is completely characterized by, and enjoys, once hardened, remarkable performance, in particular fire resistance and mechanical resistance especially when totally immersed.

Another object of the invention is to provide an installation permitting practicing this process under economical conditions.

The process contemplated by the invention to treat a first pulverulent material based on calcium sulfate so as to prepare a new hydraulic binder is characterized in that it combines the two following successive steps:

(a) the pulverulent material is heated to a temperature substantially comprised between 220° C. and 360° C. in the presence of steam under suitable conditions to form principally calcium sulfate of the a variety, (b) the material thus heated is subjected to thermal quenching consisting in cooling by at least 150° C. in a time less than 15 minutes by means of a cold dry gas injected under pressure into the mist of the latter.

By "cold dry gas" is meant a gas whose temperature is less than about 50° C. (preferably ambient temperature of the order of 20° to 30° C. or a temperature below the latter) and whose water vapor content is less than about 5% (mass of vapor relative to the total mass of the gas) preferably less than 1%.

The process of the invention has been conceived from the following observation: when a calcium sulfate is treated in a usual manner to obtain "improved plaster", the product obtained is in fact a mixture which contains effectively α anhydrite but in which this variety is present in a very minor proportion and is mixed with other anhydrous forms (γ anhydrite) or hydrated forms (semihydrates, dihydrates, . . . ). The inventor's studies have shown that this results essentially from two factors: heating leading to a anhydrite but also to other forms, and above all an evolution of the product after heating, with partial transformation of the latter particularly by rehydration. The essential idea having led to the process of the invention has been to provide a final stable product containing a weight proportion of α anhydrite much higher than that contained in known improved plasters and, to do this, to fix the structure of the obtained compound at the end of heating by thermal quenching. The final transformation of the α anhydrite formed by heating is thus considerably limited.

The quenching operation is preferably carried out so as to bring the heated material to a temperature below 100° C. in a time comprised between 6 and 12 minutes. It can be carried out by means of cold dry compressed air, injected at several locations into the moving material, the air flow rate being adjusted to obtain the desired speed of cooling.

According to a preferred embodiment of the process, at the end of the heating operation, the heated material is poured from an upper level to a lower level at which it is conveyed by vibration as a bed; the quenching operation is carried out on the one hand by sending a first cold and dry air flow through the curtain of falling material between the upper level and the lower level, and on the other hand by injecting cold and dry air through the bed of material in the course of conveyance at the lower level.

The new hydraulic binder obtained by the mentioned process is a stable mixture of a anhydrite of calcium sulfate and of bassanite, in which the weight proportion of a anhydrite is greater than 35%, and particularly comprised between 40% and 65%; this mixture contains very little or no γ anhydrite.

The composition of this mixture and its high proportion of α anhydrite impart remarkable characteristics to the products obtained by setting of the binder, in particular:

fire resistance: inflammability classed in the category M0 according to the Standard NF P 92-507, compressive strength: between 250 and 300 bars bending strength: between 55 and 70 bars.

One explanation of this performance takes account in part of the soluble nature of α anhydrite and of the higher specific surfaces obtained with this variety (of the order of 6 $m^2/g$) which leads, during use of the binder, to a rapid and homogeneous precipitation. It is to be noted that the products obtained by including conventional fillers in the binder according to the invention, impart remarkable mechanical resistance when immersed in water, much higher than the analogous products obtained with known improved plasters.

Essential inventive concept of the invention has thus been to increase the proportion of α anhydrite in the product, the essential means used consisting in limiting, by quenching, the evolution of the product after heating. To improve still further this proportion of α anhydrite, the inventor is also led to optimize the heating operation so as to obtain the highest possible quantity of this variety at the end of heating.

The following conditions of operations seem to give the best results: first of all, the moisture content of the initial material is determined and is adjusted if needed to a value substantially comprised between 12% and 25%; the heating operation is then carried out by causing the pulverulent material to travel in an agitated bed in a confined gaseous atmosphere containing at least a portion of the water vapor freed from the material, and by heating the whole under conditions suitable to raise the temperature of the gases above the bed of material to a value comprised between 400° and 500° C., and in bringing the mean temperature at the interior of the material to a value higher than 250° C. and below 300° C. The heating is in particular carried out by means of infrared radiant heaters disposed above the bed of material, the emission power of said radiant heaters being adjusted in correlation with the speed of travel of the bed of a material to obtain suitable values of the temperature of the gases above the bed and of the temperature at the interior of the material.

The operating conditions have been defined in a pragmatic manner as a result of long trial and error and tests. A possible explanation of the best results obtained thanks to these operative conditions is the following: the temperature of 250°–300° C. at the interior of the bed of material is ideal to produce α anhydrite in the absence of other varieties; the water vapor extracted escapes above the bed of material in a hotter atmosphere whose temperature is higher than its critical point (365° C.): it very rapidly reaches the supercritical condition which avoids (or limits) a re-hydration and an evolution at the surface of the material such that at the end of heating, the proportion of α anhydrite is very high (without it being able to give precise proportions because samples taken before quenching evolve immediately). The proportion of bassanite which is observed in the final hydraulic binder results essentially from a certain transformation of α anhydrite which takes place at the beginning of quenching; this phenomenon has been detected by studying the temperature profile in the course of treatment: there is thus observed a slight rise in temperature of the material at the beginning of quenching (15°–20° C.) which can be explained only by the exothermic transformation reaction of α anhydrite to bassanite; but this transformation is very quickly stopped by quenching which stabilizes the α anhydrite. Moreover, it appears that the quenching stops completely an evolution of α anhydrite into γ anhydrite (insoluble or hardly soluble) which is present only in trace amounts in the final product (contrary to known binders which have a high proportion of this variety).

The invention includes an installation permitting the practice of the process defined above. This installation comprises, in combination, a heating tunnel having an upstream end and a downstream end, supply means for starting material from the upstream end of said heating tunnel, longitudinal troughs juxtaposed in the heating tunnel and adapted to contain the material, combs of a heat conductive material inserted in the troughs and of such a shape as a divide the mass of material contained in the latter, adjustable means to vibrate said troughs adapted to give rise to conveyance of the material from the upstream end toward the downstream end, heating means, in particular radiant heating means, of adjustable power, located above the troughs in the heating tunnel, cooling means having an upstream end and a downstream end and located at a lower level relative to the heating tunnel, a container of elongated shape extending in the cooling means to contain the material, adjustable means for vibrating said container adapted to give rise to conveyance of the material from the upstream end toward the downstream end, means for passage by gravity of the material from the downstream end of the heating tunnel into the upstream end of the cooling device, means for injecting compressed dry and cold air into the mentioned passage means, means for injection of dry and cold compressed air into the cooling means, and means for removing material from the downstream end of the cooling device.

Figure 2:
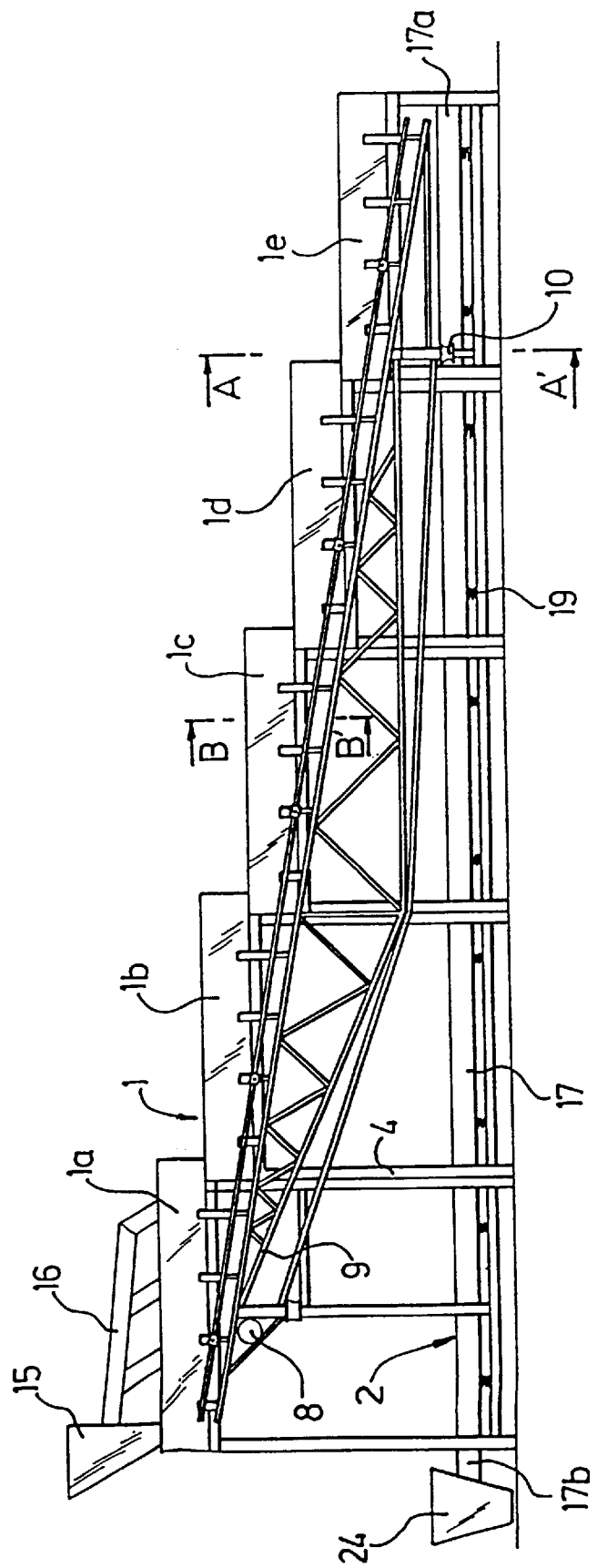
Figure 3:
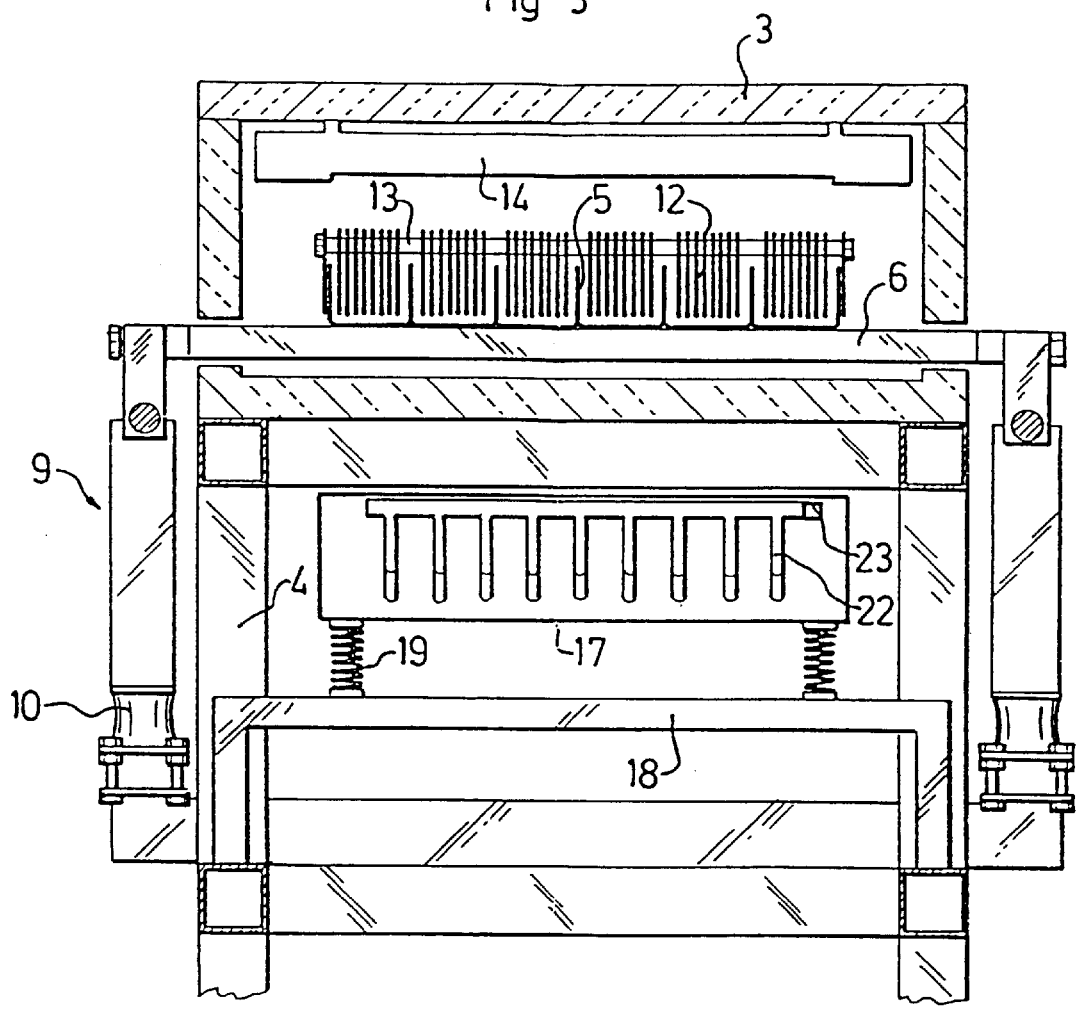
Figure 4:
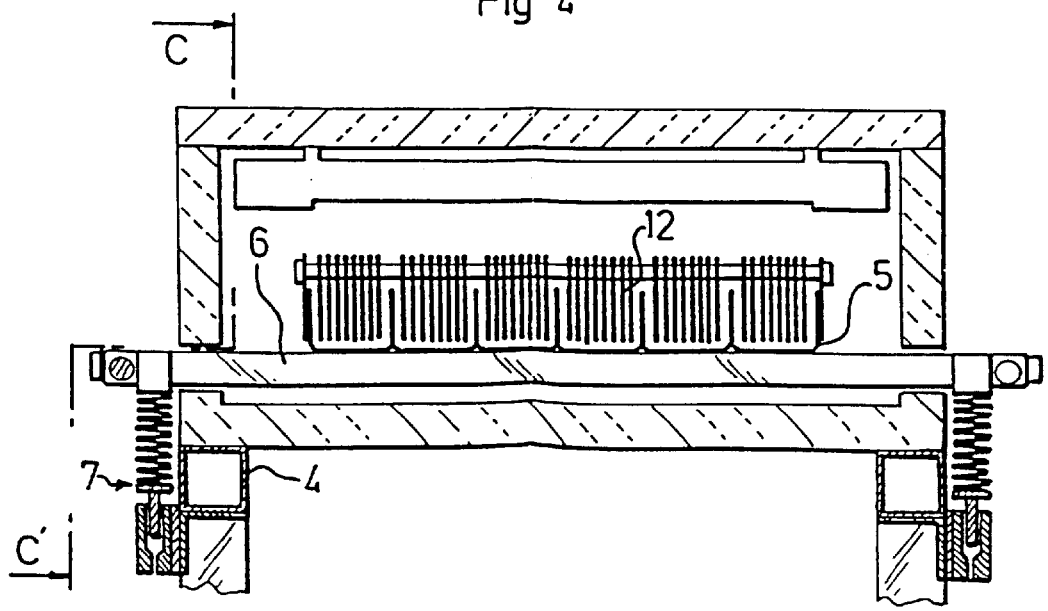
Figure 5:
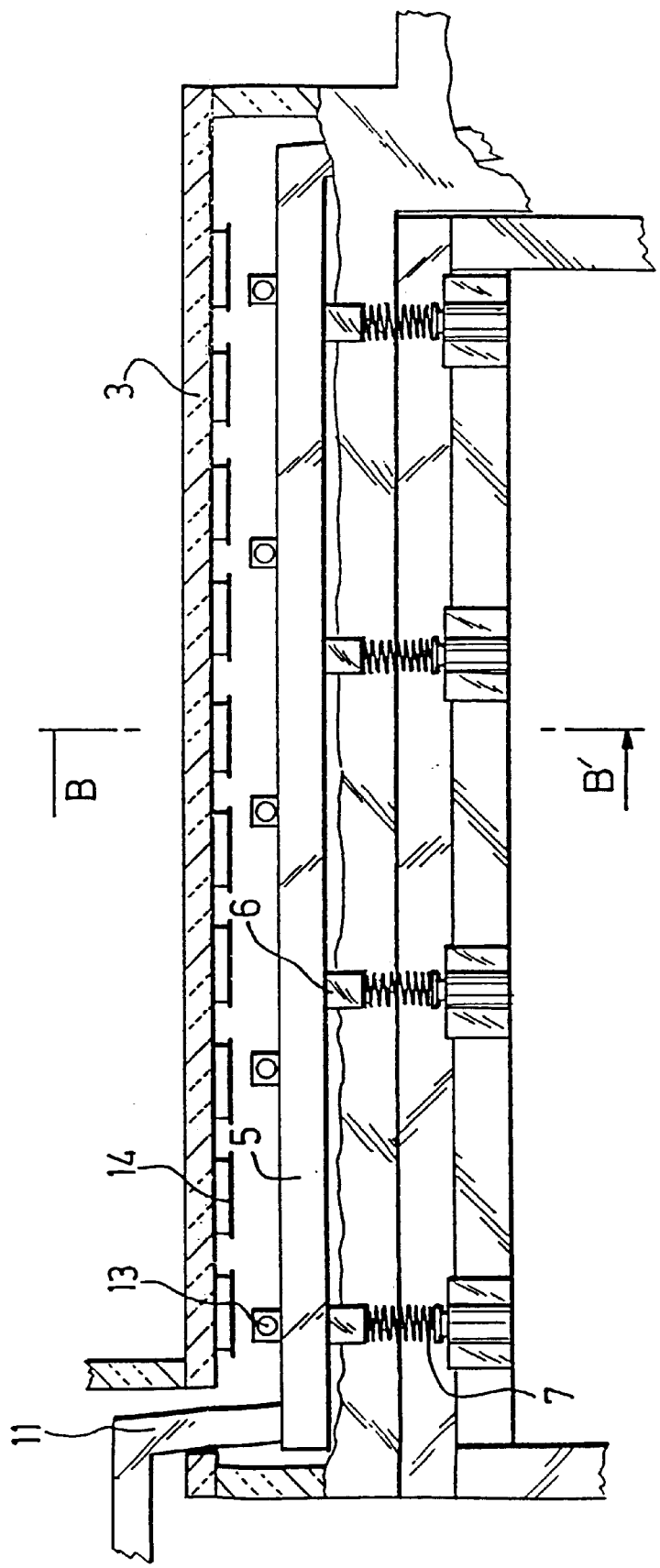
Figure 6:
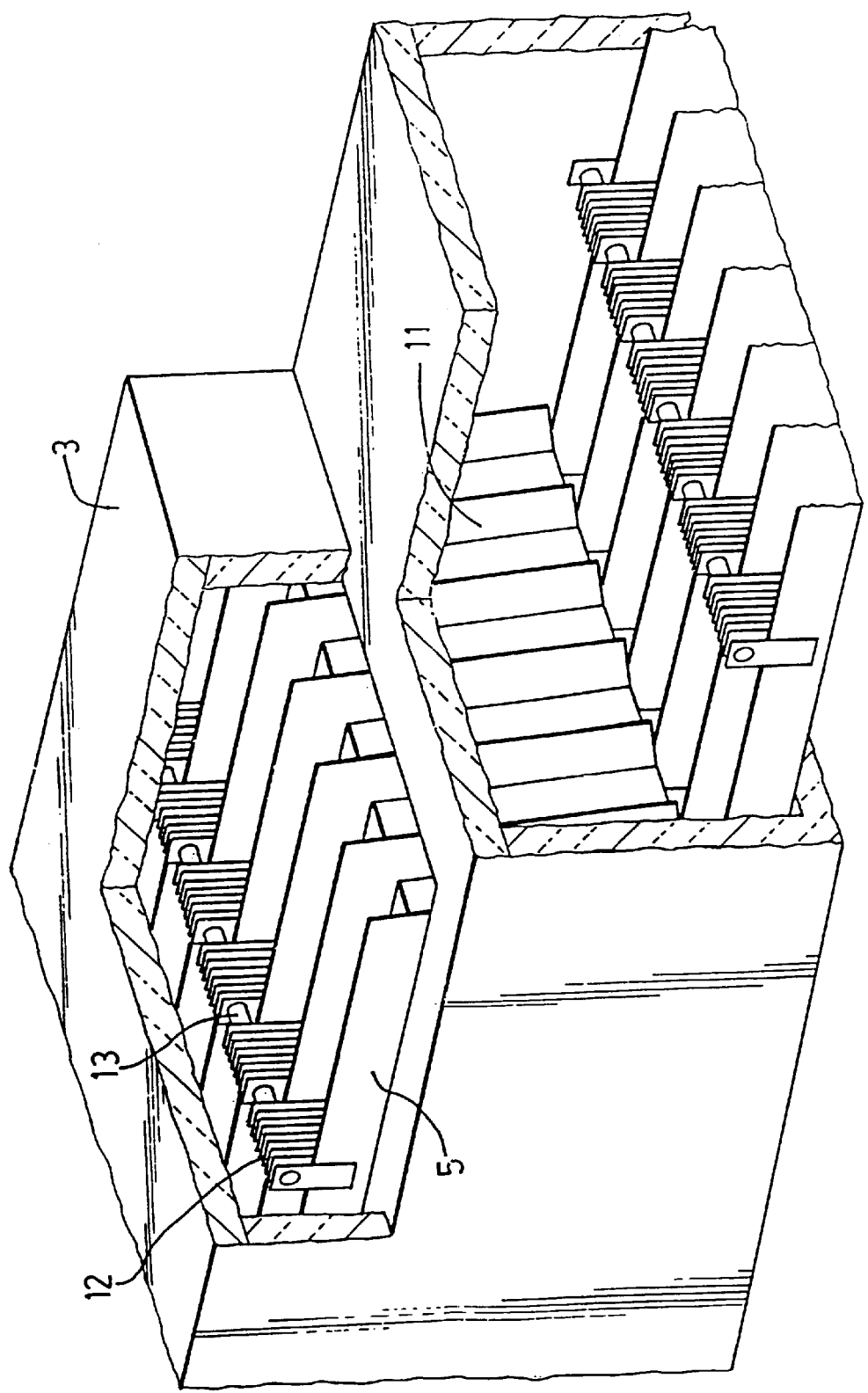
Figure 7:
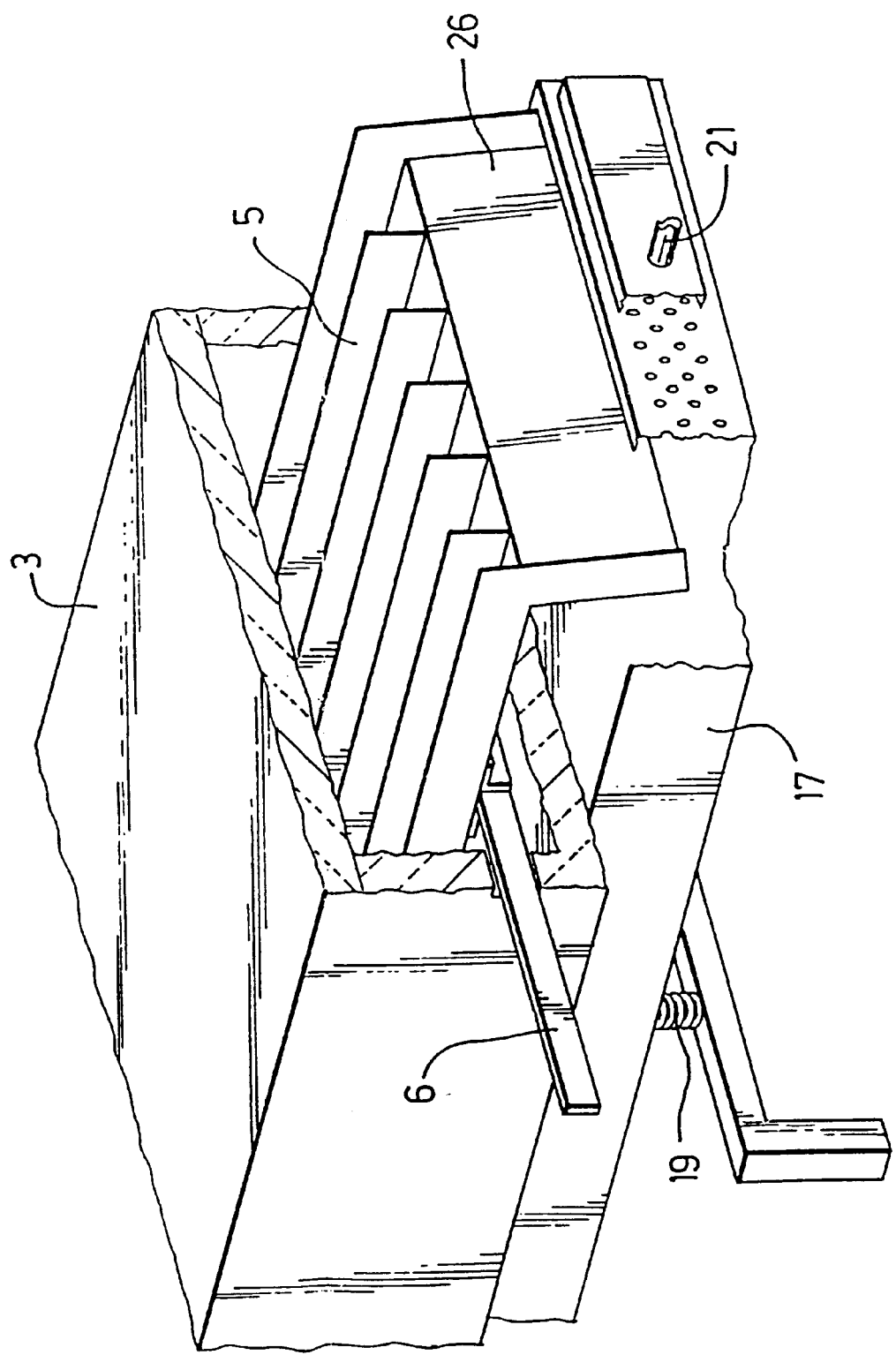

Other characteristics, objects and advantages of the invention will become apparent from the following description with reference to the accompanying drawings; in the drawings:

FIG. 1 is a schematic perspective view of an embodiment of a treating installation according to the invention, FIG. 2 is a side view, FIG. 3 is a transverse cross-sectional view on the line AA', FIG. 4 is a transverse cross-sectional view of a stage of the heating tunnel on the line BB', FIG. 5 is a longitudinal cross section of a stage of the heating tunnel on the broken line CC', FIG. 6 is a detailed perspective view of the passage means from one stage of the heating tunnel to the lower stage, FIG. 7 is a detailed view of the means permitting the passage of the material by gravity from the heating tunnel to the cooling device, and means for injecting cold dry compressed air, FIG. 8 is a fragmentary longitudinal cross-sectional view showing in particular the cooling device and its compressed air injection rack.

The treatment installation shown by way of example in the figures permits preparing an improved hydraulic binder from an initial pulverulent material based on calcium sulfate.

This installation comprises essentially on the one hand, an upper heating tunnel 1 constituted by several stages 1a, 1b . . . 1e disposed following each other with a vertical offset downwardly between two successive stages, on the other hand a lower cooling device 2.

Each stage of the heating tunnel is constituted by insulating walls, resistant to heat, such as 3, which close the tunnel on the sides, from above, from below, and frontally between two stages (FIGS. 3, 4, 5). These walls are supported by a tubular frame 4.

Longitudinal troughs 5 are disposed in the tunnel to contain the pulverulent material and to guide it from the upstream end of the heating tunnel (corresponding to its upper portion) to its downstream end (corresponding to its lower portion). These juxtaposed troughs are carried by supports 6 mounted on resilient means such as spring systems 7 and connected to adjustable vibrating means permitting transmitting to said troughs a vibration of adjustable amplitude and frequency.

In the example, a vibrator 8 of the adjustable amplitude and frequency type is associated with a trellis frame 9 which is fixed laterally on the frame 4 by means of resilient blocks 10 of the "Silent block" type. The vibrator vibrates the assembly of the frame 9, supports 6, troughs 5 and ensures conveyance of the pulverulent material by vibration. Between two stages, the troughs 5 are prolonged by vertical or highly inclined portions 11 which play the role of gravity passage means for the material from one trough stage to the lower stage, the material falling freely from one stage to the other.

Of course, any other system of vibration may be provided, in particular a plurality of vibrators distributed along the heating tunnel to vibrate directly the supports of the troughs 6 (in the absence of frame 9).

The troughs contain combs such as 12 of a heat conductive material, so as to divide locally the mass of material and to ensure heat transfer into the interior of this latter by conduction. These combs, distributed along the troughs, are carried by cross members 13 provided on the lateral sides of the troughs. The upper stage 1a of the troughs need not have any combs.

Moreover, the heating tunnel comprises infrared radiant heating means such as 14, which are each disposed transversely above the troughs so as to irradiate all the width of the troughs. These radiant heating disposed adjacent each other are provided with electrical supply connected to means for regulating the emitted power, associated with conventional temperature probes (not shown) disposed in the heating tunnel. The lower stage 1e of the troughs has no radiant heaters. The numbers of radiant heaters and their power are provided so as to permit raising and maintaining the temperature of the gases in the tunnel to a value comprised between 400° C. and 500° C. and to bring the mean temperature within the material to a value comprised between 250° C. and 300° C. The precise adjustment of the desired temperatures can be effected by regulating the power of emission of the radiant heaters in correlation with the speed of travel of the material.

Above the upstream end of the heating tunnel is provided a hopper 15 for supplying initial material, which is preheated by means permitting removing the hot gases in the tunnel adjacent this upstream end and transferring them to the material contained in the hopper. In the example, these means are very simply constituted by a conduit 16 which opens into the hopper 15 and removes the hot gases at the upper stage 1a of the tunnel through three openings distributed along this upper stage.

Moreover, the cooling device 2 is arranged below the heating tunnel 1, as will be described.

This device comprises a container 17 of elongated shape, which is carried by cross members 18 by means of elastic means such as spring systems 19. These cross members 18 are secured to the frame 4. These means are arranged such that the container will be slightly inclined from its upstream end 17a toward its downstream end 17b. A vibrator 20 of the same type as the vibrator 8 permits vibrating the container with adjustable amplitude and frequency.

The upstream end of the container 17 is prolonged beyond the troughs of the stage 1e of the heating tunnel such that the pulverulent material falls over a ramp 26 from said troughs into the container. At this level, the device is provided with means 21 for the injection of cold dry compressed air, toward the stream of material which falls by gravity into the container. It is to be noted that this stream of material creates a sufficient plug to block the hot air from the heating tunnel and to avoid passage of this latter into the cooling device; on the contrary, the hot air has the tendency to rise in the heating tunnel from its downstream end toward its upstream end by natural flow effect, promoted by the ascending geometry of the heating tunnel from the downstream toward the upstream end, by the lower temperature in the lower stages, and by the removal of gas from the upper stage 1e. Thus, in the heating tunnel, the gases circulate countercurrent relative to the pulverulent material, which increases the solid/gas exchange.

The thermal quenching undergone by the pulverulent material during its passage into the cooling device is achieved by injecting cold dry air flows into the bed of material moving in the container 17.

To this effect, the manifold 22 for injection of compressed air is disposed in the container so as to descend into the interior of the material, as shown in FIG. 8. This manifold is inclined in the direction of movement of the material and contributes to moving the material: agitation in place leading to a sort of suspension of the particles in the current of cold air, moving of the assembly from upstream toward the downstream end. This manifold is supplied by a network of conduits 23 connected to a common compressed air supply.

The mentioned injection means permit obtaining good air/solid heat exchange and an excellent quenching efficiency. In practice, the flow of cold dry compressed air will be adjusted to obtain a cooling of the material from a value comprised between 250° C.–300° C. at the outlet of the heating tunnel to a value below 100° C. at the outlet of the cooling tunnel, the duration of cooling being comprised between about 6 and 10 minutes.

Evacuation means such as a hopper 24 provided with a helicoidal extraction screw 25 permit recovery of the material after treatment.

The installation described permits producing a new hydraulic binder from calcium sulfate, by favoring in the heating tunnel the formation of a anhydrite of calcium sulfate (the γ form being practically absent) and by limiting, thanks to the thermal quenching carried out in the cooling device, the evolution of the product leaving the heating.

In the example of embodiment which follows, the initial material was phosphogypsum from Morocco, calcined to provide a powder of granulometry less than 0.5 mm. This powder had a moisture content of 20%.

The power of the radiant heaters 14 of the heating tunnel and the vibratory regime of vibrator 8 are adjusted such that the powder remains about 12 minutes in the heating tunnel, the mean temperature of the gas is about 480° C. and the mean temperature in the interior of the material is 250° C. This thermal treatment ensures a dehydration of the initial material and, in the heated gaseous atmosphere containing a portion of the freed water vapor, a transformation of a high proportion of said material into a anhydrite of calcium sulfate.

The injected compressed air, on the one hand against the stream of powder falling from the heating tunnel into the cooling device, and on the other hand through the manifold 22, has a moisture content less than 1% and a temperature of 25° C. The air flow rate has been adjusted such that the powder at the outlet of the heating tunnel will be cooled to ambient temperature in the cooling device in ten minutes.

An analysis of the temperature profiles has permitted determining an increase of temperature of the order of 20° C. (at the beginning of the cooling tunnel) which is due to a certain exothermic rehydration of the product; however, the latter is very quickly blocked by the quenching and at the outlet of the cooling device, the product has the following composition:

α anhydrite of calcium sulfate (soluble anhydrite): 50% by weight, bassanite: 50% by weight, γ anhydrite of calcium sulfate (insoluble anhydrite): mere traces.

This composition has been analyzed by the following analyses: weight thermal analysis, diffractometric analyses, x-ray analyses, infrared spectrometry.

The specific surface of the product has been measured by adsorption of nitrogen (B.E.T. method) and the found value is 5.96 $m^2/g$ (in comparison to that of cement of the order of 1 $m^2/g$)

The same analyses were carried out on a specimen of conventional improved plaster from Germany and made from products of desulfurization of a heating plant. The results obtained for these improved plasters are the following:

α anhydrite of calcium sulfate: 8%, bassanite: 37% by weight,

γ anhydrite of calcium sulfate: 55%

The specific surface measured was: 3.64 $m^2/g$.

The high specific surface of the binder according to the present invention and its high proportion of soluble a anhydrite give to the products produced by setting of the binder (in the absence or in the presence of fillers) remarkable mechanical qualities and fire resistance.

Thus, the product obtained by setting of the binder according to the invention set forth above (without fillers) has been subjected to inflammability tests according to the Standard NF P 92-507 (specimens 0.30 m/0.40 m subjected to radiation by constant heat source). The determination of the four indices above, by this standard (flammability index, development index, index of maximum length of the flame, combustibility index) has permitted classifying the product in the highest MO category of the six categories provided by the standard.

Moreover, resistance tests according to the standard have given the following results:
resistance to compression: 280 bars,
resistance to bending: 65 bars.

Moreover, qualitative tests in an immersed environment have shown that the product kept good strength qualities under these circumstances.

What is claimed is:

1. A process for treatment of a pulverulent material comprising calcium sulfate so as to prepare a hydraulic binder comprising a stable mixture of α anhydrite and bassanite, in which a weight proportion of a anhydrite is greater than 35%, wherein the two following successive treatment steps are performed in combination:
   (a) heating the pulverulent material to a temperature between 220° C. and 360° C. in the presence of water vapor to form mostly calcium sulfate of a variety,
   (b) subjecting the heated pulverulent material to thermal quenching by cooling by at least 150° C. in less than 15 minutes by means of a gas injected under pressure.

2. The treatment process according to claim 1, wherein the quenching operation (b) is carried out so as to bring the pulverulent material to a temperature below 100° C. within a range of 6 to 12 minutes.

3. The treatment process according to claim 1, wherein the gas injected under pressure of quenching operation (b) is cold dry compressed air, directed toward the pulverulent material, the flow rate of the cold dry compressed air being adjusted to obtain the temperature reduction of quenching operation (b), wherein the cold dry compressed air has a water vapor content is less than about 5% mass of vapor relative to total mass of the gas, and a temperature less than about 50° C.

4. The treatment process according to claim 3, wherein at the end of operation (a), the heated pulverulent material is poured from an upper level conveyance to a lower level conveyance within which the pulverulent material is brought by vibration to travel in a bed, the quenching operation (b) being carried out both by blowing a first flow of the cold and dry air through a curtain of falling said pulverulent material, between the upper level conveyance and the lower level conveyance, and also by injecting flows of the cold dry air into an interior of said material during movement to the lower level conveyance.

5. The treatment process according to claim 1, wherein the humidity content of the starting pulverulent material is adjusted to between 12% and 25%, the heating operation (a) being carried out by causing the pulverulent material to flow in an agitated bed under a gaseous atmosphere water vapor freed from the pulverulent material, wherein a temperature of the gaseous atmosphere above the bed of material is raised to a value between 400° C. and 500° C., so that a mean temperature within the pulverulent material is raised to a value higher than 250° C. and lower than 300° C.

6. The treatment process according to claim 5, wherein the heating operation (a) is carried out by means of infrared radiant heaters (14) disposed above the bed of pulverulent material, an emission power of said radiant heaters being adjusted in correlation with the speed of travel of the bed of pulverulent material to obtain both the temperature of the gaseous atmosphere above the bed and the mean temperature within the pulverulent material.

7. The treatment process according to claim 5, wherein during the heating operation (a), the pulverulent material is made to travel by vibration in juxtaposed troughs (5), in which are inserted combs (12) of a heat conductive material so as to divide the bed of pulverulent material and to ensure heat transfer into the interior of the the pulverulent material by conduction.

8. The treatment process according to claim 7, wherein during the heating operation (a), the pulverulent material traveling in the troughs is caused to fall by gravity from one trough stage to a lower trough stage, a portion of the hot gases being recovered to serve for preheating newly-introduced pulverulent material.

9. An apparatus for the treatment of an initial material present in pulverulent form comprising:
   a heating tunnel having an upstream and a downstream end,
   means for supplying the initial pulverulent material to the upstream end of said heating tunnel,
   longitudinal troughs juxtaposed in the heating tunnel,
   combs of a heat conductive material inserted in the troughs and of such shape as to divide the mass of pulverulent material contained in the troughs,
   adjustable means for vibrating said troughs to cause movement of the pulverulent material from the upstream end toward the downstream end,
   adjustable heaters located above the troughs in the heating tunnel,
   a cooling device having an upstream end and a downstream end and located at a lower level relative to the heating tunnel,
   a receptacle of elongated form extending in the cooling device to contain the pulverulent material,
   adjustable means for vibrating said receptacle so as to cause movement of the pulverulent material from the upstream toward the downstream end of the receptacle,
   means for passage by gravity of the pulverulent material from the downstream end of the heating tunnel into the upstream end of the cooling device,
   means for injecting cold dry compressed air into the passage means, the cold dry compressed air having a water vapor content less than about 5% mass of vapor relative to total mass of the gas, and a temperature less than about 50° C.,
   means for injection of compressed air into the cooling device, and
   means for removing the pulverulent material from the downstream end of the cooling device.

10. The apparatus according to claim 9, wherein the heating tunnel comprises several stages of troughs and means for passage by gravity of the pulverulent material from one trough stage to a lower trough stage.

11. The apparatus according to claim 9, wherein the troughs are carried by supports mounted on resilient means and connected to the trough vibration means, the trough vibration means being adjustable as to both amplitude and frequency of vibration.

12. The apparatus according to claim 9, wherein the adjustable heaters of the heating tunnel comprise infrared radiant heaters having an electrical support connected to a heater controller associated with temperature probes disposed in said heating tunnel.

13. The apparatus according to claim 9, further comprising, adjacent the upstream end of the heating tunnel, means for removing gas associated with transfer means for this gas toward the pulverulent material contained in the supply means for preheating.

14. The apparatus according to claim 9, wherein the means for injecting compressed air into the cooling device comprises an air injection manifold disposed in the receptacle.

15. A hydraulic binder containing calcium sulfate, said calcium sulfate comprising a stable mixture of α anhydrite and of bassanite, in which a weight proportion of α anhydrite is greater than 35%.

16. The hydraulic binder according to claim 15, wherein the weight proportion of α anhydrite is between 40% and 65%.

17. The hydraulic binder according to claim 16, having the following characteristics after setting:

a fire resistance with an inflammability classed in the category MO according to the Standard NF P 92-507, a compression resistance of between 250 and 300 bars, and a bending resistance of between 55 and 70 bars.

* * * * *